May 23, 1939.  W. T. DUNN  2,159,428
DRIVING MECHANISM
Filed April 15, 1936   2 Sheets-Sheet 1
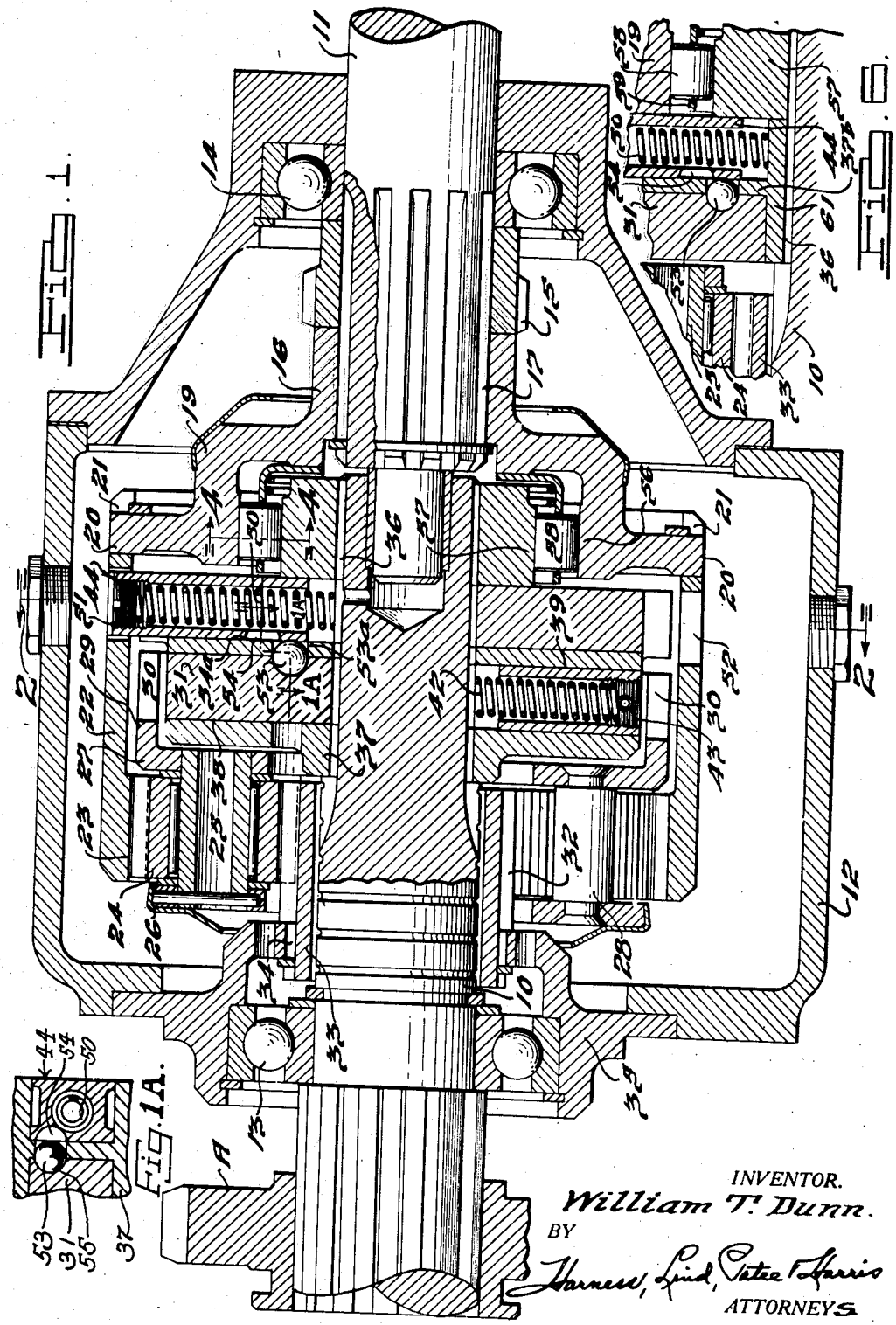
INVENTOR.
William T. Dunn.
BY
ATTORNEYS.

May 23, 1939.  W. T. DUNN  2,159,428
DRIVING MECHANISM
Filed April 15, 1936  2 Sheets-Sheet 2
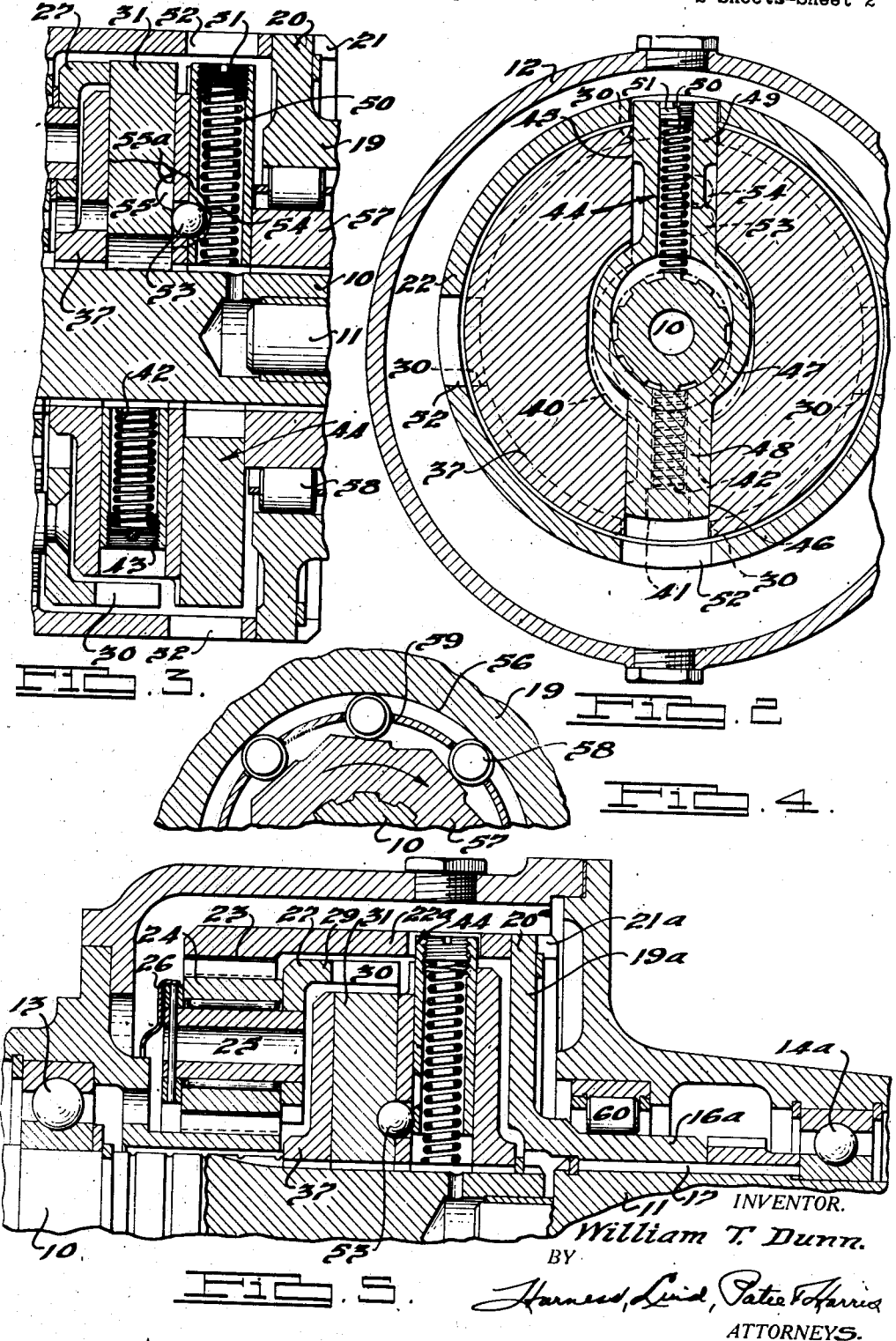

Patented May 23, 1939

2,159,428

UNITED STATES PATENT OFFICE 2,159,428

DRIVING MECHANISM

William T. Dunn, Detroit, Mich., assignor to Chrysler Corporation, Highland Park, Mich., a corporation of Delaware Application April 15, 1936, Serial No. 74,400

24 Claims. (Cl. 74—260)

This invention relates to driving mechanisms and refers more particularly, in one embodiment thereof, to improvements in driving mechanisms for motor cars or vehicles, especially where it is desired to vary the driving speed ratio between the vehicle engine or prime mover and the propelling ground wheels.

One object of my invention resides in the provision of an improved driving mechanism adapted, under predetermined desired conditions, to automatically effect the drive for the vehicle. My driving mechanism is preferably adapted for use in connection with a speed ratio changing transmission of any desired type, and is adapted to establish an auxiliary, preferably automatically operating, driving speed ratio for the vehicle, such as an overdrive ratio for example.

A further object of my invention resides in the provision of an improved driving or speed ratio changing mechanism adapted to automatically respond in its actuation to predetermined desired conditions of operation of the vehicle. Thus, by way of example, I have provided an overdrive which is automatically effective when the vehicle attains a predetermined speed so that, on reaching this critical speed, the overdrive becomes effective and on falling below this critical speed the overdrive becomes ineffective.

In carrying out the aforesaid objects of my invention I have provided an improved form and arrangement of driving mechanism having a clutching part thereof which, where an overdrive speed ratio is desired for the vehicle, is driven, when inoperative as a drive, at a speed less than that of a shaft or other part cooperating therewith and driven from the engine. Ordinarily, I prefer to arrange my driving mechanism between driving or driven shafts or other parts respectively responsive in their actuation to the engine and vehicle driving speeds.

In order to effect the aforesaid automatic engagement and disengagement of the drive through the driving mechanism, I have provided, in the specific illustrated embodiments of my invention, two clutches which will automatically connect and release the clutch control parts of the drive under predetermined desired conditions of relative speeds of the engine and vehicle, or driving and driven shafts. Each of these automatic clutches primarily consists of a centrifugally operated clutching element. One of said elements is adapted for positive clutching engagement with a slot provided in the cylindrical member of the internal gear, where certain types of gearing are employed, to provide a direct two-way drive between the driving and driven shafts; the other of said elements is adapted for clutching engagement with a slot provided in the cylindrical member of the planet pinion carrier of the planetary overdrive gearing, for example, to provide an overdrive.

A further object of my invention is to provide an automatic overdrive mechanism between driving and driven shafts incorporating improved clutching means and latching means for controlling the operation of the clutching means.

Another object of my invention is to provide an improved arrangement of planetary gearing for the overdrive gear train, this gear train being controlled by automatic clutch means preferably of the centrifugal force operated type.

A further object of my invention is to provide an improved control for clutching means, which may be of the automatic centrifugal force type, for controlling the drive through a change speed gear train, this controlling means being so arranged that operation of the clutching means toward clutching engagement is prevented until relative movement takes place between the driving and driven shafts. This control is preferably arranged to prevent operation of the clutching means even though the clutching means is subjected to conditions otherwise tending to effect movement of the clutching means toward clutch engagement, especially where the clutching means includes a centrifugal force operated clutching element. Such arrangement prevents undesired wear of the clutching means and noises incident to the "ratcheting" effect of certain types of clutching means and has other advantages which will presently be more apparent.

An additional object of my invention is to provide an improved control for a clutching means, which may be of the automatic centrifugal force type, for controlling a direct drive between driving and driven shafts especially where these shafts are adapted for a speed ratio drive such as an overdrive therebetween. With this arrangement I have provided an improved control for the clutching means for the direct drive as well as the speed ratio drive. This controlling means, according to the preferred embodiment of my invention, consists of a novel ball detent arrangement so arranged as to control the clutching means for the direct drive, the clutching means for the speed ratio drive, or both of these clutching means. Where separate centrifugal clutches are provided for the direct and speed ratio drives respectively, I have provided an interlocking control for these clutching means insuring against their improper operations, facilitating changes in the speed ratio drives including a direct drive, protecting the parts of the mechanism against undue wear and destructive influences, and simplifying the mechanism as a whole and the operation thereof.

A still further object is to provide an automatic speed changing mechanism of the positive clutching synchronizing type incorporating a novel form of releasing means between the driving and driven shafts in order to effect a change in the driving conditions. By reason of my improvements I am able to do away with overrunning clutches, etc. so that, if desired, the synchronizing of the clutching parts of the mechanism may be effected by an automatic means releasing the shafts independently of the more conventional types of overrunning roller clutches.

More particularly, further objects of my invention are to provide a mechanism of the character aforesaid having improved characteristics of long life, quietness of operation, automatic response to the speed of vehicle travel, and relatively low cost.

A further object of my invention is to provide an improved automatic overdrive adapted to function, in controlling the drive, with a minimum of manual control.

Further objects and advantages of my invention will be more apparent from the following detailed description of several illustrative embodiments of my invention, reference being had to the accompanying drawings in which:

Fig. 1 is a sectional elevational view of my overdriving mechanism.

Fig. 1A is a detail sectional view along line 1A—1A of Fig. 1.

Fig. 2 is a transverse sectional elevational view taken approximately as indicated by the line 2—2 in Fig. 1.

Fig. 3 is a fragmentary sectional elevational view of parts shown in Fig. 1 but illustrating the clutching elements in different positions of their movement.

Fig. 4 is a detail sectional elevational view taken as indicated by the line 4—4 of Fig. 1.

Fig. 5 is a fragmentary view corresponding to Fig. 1 but illustrating a modified form of my overdriving mechanism.

Fig. 6 is a fragmentary sectional view illustrating a modified clutching structure for the Fig. 1 mechanism.

Referring to the drawings, I have illustrated my driving mechanism operating between a power driving shaft 10 and a driven shaft 11. These two shafts may be arranged anywhere along the line of power transmission between the usual engine and driving ground wheels of the motor vehicle and inasmuch as such parts are well known, I have not illustrated them in my drawings. The shaft 10 preferably receives its drive from the usual change speed transmission mechanism A to the rear of which is located a casing 12 for housing the overdrive mechanism. Shaft 10 is suitably rotatably journalled, one bearing therefor being shown at 13 while shaft 11 is rotatably journalled by bearing 14, the usual speedometer drive being taken from shaft 11 by gearing 15 in a well known manner.

The driven shaft is provided with an enlarged forward extension coaxial with the aligned axes of shafts 10 and 11 and surrounding the rear end of shaft 10 and while this enlarged portion may be formed integrally with shaft 11 such structure is preferably built up for convenience of manufacture. This extension may consist of a hub 16 drivingly secured to shaft 11 by the splines or teeth 17, this hub carrying a cylindrical member 19. This latter member has a plurality of circumferentially spaced radial projections 20 adapted to fit into rearwardly extending slots 21 of a cylindrical driving member 22, formed at the forward end, where planetary gearing is employed, with an internal gear 23 meshing with a plurality of circumferentially spaced planetary gears 24 mounted on axles 25 connected by ring-like carriers 26 and 27. These carriers may also be connected intermediate a pair of the planetary gears by suitable spacing structures 28, and the carrier 27 is provided with a rearwardly extending driving member in the form of a cylindrical shell-like clutching portion 29 thereof having a plurality of circumferentially spaced slots 30 adapted for clutching engagement with the centrifugal force operated clutching element 31 for the overdrive as will be presently more apparent.

The driving member 22 transmits a drive from driven shaft 11 to the internal gear 23 prior to the overdrive from the driving shaft 10 to the driven shaft 11 as will presently be more apparent. When the overdrive is established, with the engine driving the vehicle, the driving member 22 transmits the drive from the internal gear 23 to the driven shaft 11.

The planetary gears 24 also mesh with a sun gear 32 carried by a sleeve 33 freely surrounding shaft 10 and non-rotatably secured by teeth 34 with a bracket 35 secured to the stationary casing 12.

The rear end of shaft 10 is provided with splined teeth 36 for drivingly engaging a cage 37 adapted to carry the clutching element or pawl 31 whereby the latter is rotated with the cage and capable of radial movement relative thereto in cage guides 38 and 39. The pawl 31 has an inwardly extending yoked portion 40 surrounding shaft 10 and terminating in an opposite partially counterbalancing end portion 41 adapted to house a spring 42 acting between shaft 10 and a threadedly adjustable abutment plug 43 threaded in the outer end of the end portion 41. The spring 42 acts to yieldingly urge the pawl 31 into the position illustrated in Fig. 1, the shaft 10 serving to limit the movement of the pawl in this direction which is the disengaged position of the pawl with respect to its clutching position with one of the slots 30.

Cage 37 is also adapted to carry a clutching element or direct drive pawl 44 whereby the latter is rotated, as pawl 31, with the cage and capable of radial movement relative thereto in cage guides 45 and 46. The pawl 44 has a clutching end portion 49 and an inwardly extending yoked portion 47 surrounding shaft 10 and terminating in an opposite partially counterbalancing end portion 48. The end portion 49 of pawl 44 is adapted to house a spring 50 acting between shaft 10 and a threadedly adjustable abutment plug 51 threaded in the outer end of the end portion 49. Spring 50 acts to yieldingly retain the pawl 44 in the position illustrated in Figs. 1 and 2, the shaft 10 serving to limit the movement of the pawl in this direction which is the engaged position of the pawl with respect to its clutching position with one of slots 52.

A detent ball 53 is carried between pawls 31 and 44 in an opening 53a in cage 37 to selectively engage detent grooves 54 and 55 respectively in said pawls. These pawls are adapted for positioning of grooves 54 and 55 as shown in Figs. 1 and 3 respectively or substantially opposite to each other during their movements.

The pawls 31 and 44 are adapted for clutch engagement with slots 30 and 52 respectively when the independent rotational speed of each of these pawls and slot combinations is substantially synchronized. While these pawls will automatically operate to synchronize with their respective slots without requiring further releasing means between the shafts 10 and 11 (as will be later referred to in connection with Fig. 5) it is sometimes deemed desirable to provide an overrunning clutch primarily to insure a direct drive in the event of a breakage of pawl 44 or to facilitate the synchronizing action in certain instances, or for other apparent reasons. This releasable clutch between the driving and driven shafts, when incorporated in the mechanism, may be in the form of a roller clutch such as is commonly used in free wheeling devices. This overrunning clutch comprises an outer clutching portion 56 of cylindrical member 19 and an inner cam member 57 drivingly connected to shaft 10 through splines 36, intermediate rollers 58 acting between the clutch portions 56 and 57 and being maintained in their proper spaced relationship by a spacer ring 59.

In the operation of my driving mechanism, and with the parts positioned as illustrated in Figs. 1, 2, and 4, it will be apparent that the drive passes from shaft 10 to shaft 11 as a direct two-way drive through the intermediary of pawl 44, the slots 30 being freely driven from the driven shaft 11 at a speed less than shafts 10 and 11 by the value of the planetary gear train. It will be apparent that this two-way drive will permit a reverse drive between shafts 10 and 11 when the normal rotation of shaft is reversed at transmission A without any manual control on the overdrive mechanism or on the overrunning clutch, when provided.

When the vehicle is driven at or above a predetermined desired speed for automatic clutching action of the overdrive, such action being determined by the resistance of spring 42 and the adjustment by the plug 43, the pawl 31 will, upon disengagement of pawl 44 caused by centrifugal force of the weighted end against the resistance of spring 50, fly outwardly to engage slot 30 as shown in Fig. 3. At this time the slot 30 is being driven at a slower speed than that of the pawl 31 by reason of the planetary gearing acting as a reduction train between the driven shaft 11 and the planetary carrier 27 so that by momentarily slowing down the speed of the driving shaft as by a momentary release of the usual accelerator pedal, the rotational speeds of the pawl 31 and slot 30 will quickly approach synchronization. At this time the pawl 31 will quickly move outwardly into one of the slots 30 to provide a positive driving connection between driving shaft 10 and planetary carrier 27. The drive will then pass from driving shaft 10 through cage 37 and pawl 31 to the carrier 27, the drive acting through the planetary gearing to the driven shaft 11 effecting an overdrive in a ratio depending on the value of the planetary gear train as will be readily understood.

Whenever the motor vehicle is driven at a speed under the critical speed necessary for engagement of pawl 31, this pawl will be urged inwardly by spring 42 to release said pawl from engagement with slot 30, whereupon pawl 44 will move outwardly by action of spring 50 to engage slot 52 to restore the mechanism to the Fig. 1 position when the driving shaft is slightly speeded up to approximately the speed of driven shaft 11 in synchronizing pawl 44 and slots 52.

The function of detent ball 53 is to regulate the clutching and declutching movements of pawls 31 and 44 so that the former cannot move toward slot 30 when the latter engages slot 52, and vice versa. This is accomplished by detent ball 53 registering momentarily with groove 54 of pawl 44 and with groove 55 of pawl 31 just prior to clutching movement of one of said pawls and just after declutching movement of the other pawl.

The direct and overdriving pawls 44 and 31 respectivly are preferably so designed in connection with their counterbalancing end portions and coil springs 50 and 42, so that at the predetermined desired speed where the direct drive pawl will release and the overdrive pawl will tend to engage, there will be a sufficient excess centrifugal force acting on the overdrive pawl to compensate for the reduction in drive shaft speed for the purpose of synchronizing the speeds of overdrive pawl 31 and slots 30. In other words there should be an excess build-up of centrifugal force acting on the overdrive pawl at the time of release of the direct drive pawl 41 so that reduction of the drive shaft speed will not prevent the overdrive pawl from moving quickly outwardly when the direct drive pawl is forced inwardly by centrifugal force overcoming its spring 50. It will be understood that the ball interlock 53 will prevent the excess centrifugal force from actually moving the overdrive pawl 31 outwardly during the direct drive or prior to the release of ball 53 from the overdrive pawl recess 55.

When the motor vehicle is accelerated in the direct drive with pawl 44 releasably connected to the driven shaft as shown in Fig. 1, the driving force acting through the pawl at one of the slots 45 will prevent pawl 44 from moving outwardly from said slot even though the speed of rotation of shaft 10 is in excess of that otherwise sufficient to effect a release for declutching movement of the direct drive pawl 44. However, when the motor vehicle is being driven above the critical speed of clutch release for the direct drive pawl 44, this pawl will immediately move inwardly in response to a momentary release of the accelerator pedal which will produce a tendency of the driven shaft to drive the driving shaft so as to momentarily unload the frictional force between pawl 44 and a slot 45 previously produced by the engine driving the vehicle. In general, the same set of circumstances also occurs in connection with the release of the overdrive pawl 31 from a slot 30 when the vehicle is decelerated from an overdriving condition to a speed less than that otherwise sufficient to cause the spring 42 to urge release of the overdrive pawl. In the latter instance, however, the effect of the force application from the driven shaft to the driving shaft is not as constant as when the driving shaft is operating the vehicle under power so that ordinarily the overdrive pawl will release in any event at some speed slightly under its normal critical releasing speed when destroying frictional driving conditions.

It will further be noted that the outer peripheral margin or edges of the pawl detent recesses 54 and 55 are preferably flared at 54ᵃ and 55ᵃ respectively, or otherwise suitably constructed to facilitate the automatic change in driving conditions as follows: thus, when the direct drive pawl 44 releases its engagement with a slot 45 and moves inwardly, at such time as this pawl has moved sufficiently to just clear the slotted driving member 22, the detent ball 53 is permitted to move a portion of its axial rearward travel in opening 53a an amount sufficient to permit overdrive pawl 31 moving outwardly to substantially take up its clearance with slotted shell 29. Further inward movement of pawl 44 into the Fig. 3 position to establish a clearance with driving member 22 will permit ball 53 to move further rearwardly and allow the overdrive pawl 31 to move further outwardly for engaging a slot 30 on synchronizing these clutching parts of the overdrive clutch. Thus, the engagement of the overdrive pawl is effected in a minimum of time over that otherwise required, were it not for the recess portions 54a and 55a, since otherwise it would be necessary for the pawl 44 to complete its inward movement prior to the start of the outward movement of the overdriving pawl 31.

In Fig. 5 I have illustrated a somewhat modified arrangement of parts primarily eliminating the overrunning clutch of Fig. 1 and I have used similar reference numerals to indicate parts of similar construction and operation.

In this modified arrangement the driven shaft 11 is rotatably journalled by a bearing 14a. The driven shaft is provided with an enlarged forward extension coaxial with the aligned axes of shafts 10 and 11 and surrounding the rear end of shaft 10. This extension consists of a hub 16a journaled in a bearing 60 and drivingly secured to shaft 11 by splines 17, this hub carrying a driving flange member 19a. This latter member has a plurality of circumferentially spaced radial projections 20a adapted to fit into rearwardly extending slots 21a of a cylindrical driving member 22a corresponding to member 22 of Fig. 1.

The operation of the mechanism illustrated in Fig. 5 is substantially the same as in the foregoing embodiment of my invention, it being apparent that with the parts positioned as illustrated in the drawings, a two-way direct drive will take place between shafts 10 and 11 through the intermediary of pawl cage 37, pawl 44, and members 19a and 22a, the slots 30 being freely driven from the driven shaft 11 through the planetary gearing as previously fully described in connection with the Fig. 1 embodiment.

When the motor vehicle is being accelerated in direct drive through pawl 44, this pawl will automatically move inwardly to its declutched position when the speed of shafts 10 and 11 exceeds the critical speed of the direct drive centrifugal clutch and in response to momentary reversal of the direction of drive just as previously explained in connection with the Fig. 1 embodiment. As the pawl 44 moves inwardly, the overrunning pawl 31 is released by the aforesaid ball detent 53, the pawl 31 moving into engagement with one of the slots 30 when the decreasing speed of shaft 10 approximates that of these slots. It will thus be apparent that this automatic change will take place without requiring an overrunning clutch, since the direct drive pawl 44 provides the releasable means between the driving and driven shafts, permitting the synchronization of the driving shaft with slots 30.

From the foregoing description it will be apparent that the parts operate substantially as previously described in effecting a change from overdrive back to the direct driving condition, the ball detent 53 controlling the sequential operation of the pawls as aforesaid.

In Fig. 6 I have illustrated a modified cage structure 37b which differs slightly from cage 37 in Fig. 1 by a flange 61 extending around shaft 10 and axially thereof to limit the movement of pawls 31 and 44 in clutching engagement and disengagement and also to act as a seat for pawl springs 42 and 50, instead of using shaft 10 for these purposes as in Fig. 1. Flange 61 is drivingly connected to shaft 10 by the aforesaid splines 36. This cage allows decreasing of the overall length of the driving mechanism as the flange of cage 37 between planet pinion axle 25 and pawl 31 in Fig. 1 is eliminated, thereby permitting the parts to be positioned closely adjacent the cage structure 37b. The operation of the mechanism illustrated in Fig. 6 is substantially the same as the embodiment illustrated in Fig. 1, it being understood that the Fig. 6 arrangement is intended for use with the general arrangement of parts illustrated in Fig. 1 or Fig. 5.

I do not limit my invention, in its broader aspects thereof, to the particular combination and arrangement of parts shown and described for illustrative purposes since various modifications will be apparent within the teachings of my invention as defined in the appended claims.

What I claim is:

1. In a motor vehicle drive, a driving shaft, a driven shaft aligned therewith, speed responsive clutching means including positively engageable clutch elements drivingly connecting said shafts when rotatably synchronized for a direct drive therebetween and so constructed and arranged as to release said direct drive in response to a predetermined speed of said shafts, means including a planetary gear train intermediate said shafts for driving said driven shaft from said driving shaft at a speed ratio different from said direct drive, said intermediate driving means further including additional speed responsive clutching means including positively engageable clutching members so constructed and arranged in association with said gear train and one of said shafts as to automatically establish said speed ratio drive subsequently to operation of the first said clutching means in releasing said direct drive and in response to synchronization of the speeds of rotation of said clutching members, one of said clutching member being adapted for movement by centrifugal force relative to said clutching elements.

2. In a motor vehicle drive, a driving shaft, a driven shaft aligned therewith, speed responsive clutching means drivingly connecting said shafts when rotatably synchronized for a direct drive therebetween and so constructed and arranged as to directly couple said shafts when the latter are not rotating and to release said direct drive in response to a predetermined speed of said shafts, means including a planetary gear train intermediate said shafts for driving said driven shaft from said driving shaft at a speed ratio different from said direct drive, said intermediate driving means further including additional speed responsive clutch means including positively engageable clutching members so constructed and arranged in association with said gear train and one of said shafts as to automatically establish said speed ratio drive subsequently to operation of the first said clutching means in releasing said direct drive and in response to synchronization of the speeds of rotation of said clutching members, the first said clutching means comprising a centrifugal force operated clutching element driven with one of said shafts and a companion clutching structure driven with the other of said shafts and adapted for positive clutching engagement with said clutching element, said clutching element being adapted for centrifugal force movement relative to movement of said clutching members.

3. In a motor vehicle drive, a driving shaft, a driven shaft aligned therewith, speed responsive clutching means including positively engageable clutching members drivingly connecting said shafts when rotatably synchronized for a direct drive there between and so constructed and arranged as to release said direct drive in response to a predetermined speed of said shafts, means including a planetary gear train intermediate said shafts for driving said driven shaft from said driving shaft at a speed ratio different from said direct drive, said intermediate driving means further including additional speed responsive clutching means so constructed and arranged in association with said gear train and one of said shafts as to automatically establish said speed ratio drive subsequently to operation of the first said clutching means in releasing said direct drive, the second said clutching means comprising a radially movable centrifugal force operated clutching element driven with one of said shafts and a companion clutching structure driven with an element of said gear train and adapted for positive clutching engagement with said clutching element when rotatably synchronized therewith, said clutching element being adapted for centrifugal force movement relative to movement of said clutching members.

4. In a motor vehicle drive, a driving shaft, a driven shaft aligned therewith, means including a planetary gear train for automatically establishing direct and speed ratio drives between said shafts, said driving means further including a pair of separate clutches respectively operable to establish said direct drive between said shafts and said speed ratio drive between said shafts through said gear train, each of said clutches being disengaged and inactive as a driving intermediary when the other of said clutches operates to establish its aforesaid drive, each of said clutches comprising a pawl clutching structure radially displaceable by centrifugal force acting thereon and a substantially cylindrical clutching structure having a slot adapted to receive the pawl to positively clutch said structures together only when the speeds of rotation of said structures are approximately synchronized.

5. In a motor vehicle drive, a driving shaft, a driven shaft aligned therewith, means including a planetary gear train for automatically establishing direct and speed ratio drives between said shafts, said driving means further including a pair of clutching means respectively operable to establish said drives, said pair of clutch means including a pair of relatively movable pawl clutch structures displaceable by centrifugal force acting thereon and a pair of relatively rotatable substantially cylindrical clutch structures slotted to respectively receive said pawls to positively clutch the pawl structure and cylindrical structure of each of said clutching means in response to approximately uniform rotation thereof, and means controlling operation of one of said clutching means in response to operation of the other of said clutching means.

6. In a motor vehicle drive, a driving shaft, a driven shaft aligned therewith, means including a planetary gear train for automatically establishing direct and speed ratio drives between said shafts, said driving means further including a pair of clutching means respectively operable to establish said drives, said pair of clutch means including a pair of relatively movable pawl clutch structures displaceable by centrifugal force acting thereon and a pair of relatively rotatable substantially cylindrical clutch structures slotted to respectively receive said pawls to positively clutch the pawl structure and cylindrical structure of each of said clutching means in response to approximately uniform rotation thereof, and means preventing operation of each of said clutching means to establish its said drive prior to release of the other of said clutching means.

7. In a motor vehicle drive, a driving shaft, a driven shaft aligned therewith, means including a gear train for automatically establishing direct and speed ratio drives between said shafts, said driving means further including a plurality of clutching means respectively operable to establish said drives, and ball latching means operable between said clutching means for controlling the relative operations of said clutching means.

8. In a motor vehicle drive, a driving shaft, a driven shaft aligned therewith, releasable direct drive means between the driving and driven shafts, supplemental driving means for driving the driven shaft from the driving shaft at a speed ratio different than said direct drive, said supplemental driving means including clutching means for controlling the drive therethrough, said clutching means including relatively movable clutching members, and means for controlling the operation of the clutching means so constructed and arranged as to prevent relative movement of said clutching members toward their clutching engagement, until said releasable drive means operates to release the drive from said driving shaft to said driven shaft, said controlling means for said clutching means including a ball detent releasably engageable with one of said clutching members.

9. In a motor vehicle drive, a driving shaft, a driven shaft aligned therewith, releasable direct drive means between the driving and driven shafts, said releasable direct drive means being so constructed and arranged as to permit relative movement between said shafts in response to a reduction in the speed of one of said shafts relative to the speed of the other of said shafts, supplemental driving means for driving the driven shaft from the driving shaft at a speed ratio different than said direct drive, said supplemental driving means including clutching means for controlling the drive therethrough, said clutching means including clutching members, one of which is adapted for centrifugal force movement into engagement with the other, and means for controlling the operation of the clutching means so constructed and arranged as to prevent centrifugal force movement of said movable clutching member toward the other of said clutching members until said releasable means operates to release the drive from said driving shaft to said driven shaft, said controlling means for said clutching means including a ball detent releasably engaging said movable clutching member prior to clutching movement thereof.

10. In a motor vehicle drive, a driving shaft, a driven shaft, means including a clutch for providing a direct drive between said shafts, said clutch including positively engageable clutching members respectively drivingly connected to said driving and driven shafts, one of said clutching members being movable in response to predetermined centrifugal force acting thereon into a position of disengagement from the other of said clutching members, said clutch further including yielding means acting on said movable clutching member in opposition to the centrifugal force movement thereof for urging said movable clutching member into positive clutching engagement with the other of said clutching members when rotatably synchronized therewith, means including a second clutch having additional positively engageable clutching members operable to drivingly connect said shafts for a speed ratio different from said direct drive, and means for controlling the operation of said clutch so constructed and arranged as to prevent movement of the first said clutching member toward clutch engagement while said speed ratio driving means is operating to drivingly connect said shafts one of said additional clutching members having clutching movement in response to centrifugal force acting thereon when synchronized with the other of said additional clutching members, said centrifugal force operated clutching members being movable relative to each other during their respective clutching movements.

11. In a motor vehicle drive, a driving shaft, a driven shaft, means including a clutch for providing a direct drive between said shafts, said clutch including positively engageable clutching members respectively drivingly connected to said driving and driven shafts, one of said clutching members being movable in response to predetermined centrifugal force acting thereon into a position of disengagement from the other of said clutching members, said clutch further including yielding means acting on said movable clutching member in opposition to the centrifugal force movement thereof for urging said movable clutching member into positive clutching engagement with the other of said clutching members when rotatably synchronized therewith, means including a second clutch having additional positively engageable clutching members operable to drivingly connect said shafts for a speed ratio greater than from said direct drive, and releasable latching means between said clutches so constructed and arranged as to prevent engagement of the first said clutch while said speed ratio driving means is operating to drivingly connect said shafts and to prevent operation of the second said clutch to connect said shafts while the first said clutch is engaged, one of said additional clutching members having clutching movement in response to centrifugal force acting thereon when synchronized with the other of said additional clutching members, said centrifugal force operated clutching members being movable relative to each other during their respective clutching movements.

12. In a motor vehicle drive, a driving shaft, a driven shaft aligned therewith, means including a gear train for automatically establishing direct and speed ratio drives between said shafts, said driving means further including a plurality of clutching means respectively operable to establish said drives, each of said clutching means including a pair of companion engageable clutching members, one of which is adapted for movement toward the other, each of said movable clutching members having a ball detent receiving opening, and a ball detent selectively engageable with said openings for insuring release of either of said clutching means prior to engagement of the other.

13. In a motor vehicle drive, a driving shaft, a driven shaft aligned therewith, means including a gear train for automatically establishing direct and speed ratio drives between said shafts, said driving means further including a plurality of clutching means respectively operable to establish said drives, each of said clutching means including a pair of companion engageable clutching members, one of which is adapted for movement toward the other, each of said movable clutching members having a ball detent receiving opening, and a ball detent selectively engageable with said openings so constructed and arranged as to hold one of said clutching means from engagement while the other is engaged and to permit progressive engaging movement of one of said movable clutching members in response to progressive disengaging movement of the other of said movable clutching members.

14. In a clutch for drivingly connecting coaxial driving and driven shafts, a pawl carrying structure adapted for driving connection to one of said shafts, a pawl receiving structure adapted for driving connection to the other of said shafts, said pawl carrying structure having a central cylindrical hub through which one of said shafts extends, a centrifugal force operated pawl carried by said pawl carrying structure and having an end clutching portion adapted to clutch with said pawl receiving structure, said pawl having a second end portion approximately diametrically opposite said clutching end portion and an intermediate portion at least partially surrounding said cylindrical hub, yielding means acting on said pawl in opposition to said centrifugal force pawl movement, said cylindrical hub being engaged by said intermediate pawl portion to limit movement of said pawl.

15. In a clutch for drivingly connecting coaxial driving and driven shafts, a pawl carrying structure adapted for driving connection to one of said shafts, a pawl receiving structure adapted for driving connection to the other of said shafts, said pawl carrying structure having a central cylindrical hub through which one of said shafts extends, a centrifugal force operated pawl carried by said pawl carrying structure and having an end clutching portion adapted to clutch with said pawl receiving structure, said pawl having a second end portion approximately diametrically opposite said clutching end portion and an intermediate portion at least partially surrounding said cylindrical hub, a coil spring seated on said cylindrical hub and acting on said pawl to move the same in opposition to said centrifugal force pawl movement, said cylindrical hub being engaged by said intermediate pawl portion to limit said pawl in one of its directions of movement.

16. In a centrifugal clutch for drivingly connecting coaxial relatively rotatable shafts, a pawl cage connected to one of said shafts and having a pair of pawls relatively movable by centrifugal force toward clutching positions, springs respectively acting on said pawls urging movement thereof in opposition to said centrifugal force pawl movement, a pair of slotted members respectively drivingly connected to the other of said shafts for rotation at relatively different speeds, each of said pawls being engageable in a slot of one of said slotted members in response to substantially predetermined synchronized rotation of each such pawl and slot, said cage having a guideway for said pawls, said guideway having an opening, a detent ball movable in said opening, each of said pawls having a detent groove selectively receiving said ball detent, said ball and grooves being so constructed and arranged to hold each of said pawls in its declutched position while the other of said pawls is in its clutched position.

17. In a drive for a motor vehicle having a power driving shaft and a shaft driven therefrom and adapted to drive the vehicle, overdriving means including planetary gearing between said shafts for driving said driven shaft at a speed greater than the speed of the driving shaft, said overdriving means further including a speed responsive clutch for automatically connecting said shafts through said planetary gearing, a second speed responsive clutch for releasably connecting said shafts for a direct two-way drive therebetween, and interlocking control means operable between said clutches to control their relative clutching operations.

18. In a drive for a motor vehicle having a power driving shaft and a shaft driven therefrom and adapted to drive the vehicle, overdriving means including planetary gearing between said shafts for driving said driven shaft at a speed greater than the speed of the driving shaft, said overdriving means further including a speed responsive clutch for automatically connecting said shafts through said planetary gearing, said speed responsive clutch including a slotted clutching element drivingly connected to an element of said gearing and a centrifugal force operated clutching element driven from said driving shaft and adapted to engage said slotted clutching element in response to predetermined substantially synchronized rotation of said clutching elements, a second speed responsive clutch for releasably connecting said shafts for a direct drive therebetween, said second clutch comprising a slotted clutching member drivingly connected to said driven shaft and a centrifugal force operated clutching member driven from said driving shaft and adapted to engage said slotted clutching member in response to predetermined substantially synchronized rotation of said clutching members, yielding means acting on said centrifugal force operated clutching element and on said centrifugal force operated clutching member in opposition to the centrifugal force acting thereon, and latching means releasably holding said centrifugal force operated clutching element against said centrifugal force movement thereof until said centrifugal force operated clutching member has moved by centrifugal force acting thereon into a position of disengagement from said slotted member.

19. In a drive for a motor vehicle having a power driving shaft and a shaft driven therefrom and adapted to drive the vehicle, overdriving means including planetary gearing between said shafts for driving said driven shaft at a speed greater than the speed of the driving shaft, said overdriving means further including a speed responsive clutch for automatically connecting said shafts through said planetary gearing, said speed responsive clutch including a slotted clutching element drivingly connected to an element of said gearing and a centrifugal force operated clutching element driven from said driving shaft and adapted to engage said slotted clutching element in response to predetermined substantially synchronized rotation of said clutching elements, a second speed responsive clutch for releasably connecting said shafts for a direct drive therebetween, said second clutch comprising a slotted clutching member drivingly connected to said driven shaft and a centrifugal force operated clutching member driven from said driving shaft and adapted to engage said slotted clutching member in response to predetermined substantially synchronized rotation of said clutching members, yielding means acting on said centrifugal force operated clutching element and on said centrifugal force operated clutching member in opposition to the centrifugal force acting thereon, and latching means releasably holding said centrifugal force operated clutching element against said centrifugal force mevement thereof until said centrifugal force operated clutching membe has moved by centrifugal force acting thereon into a position of disengagement from said slotted member, said latching means releasably holding said centrifugal force operated clutching member in its position of disengagement while said centrifugal force operated clutching element is in its clutching position.

20. In a motor vehicle drive, aligned driving and driven shafts, means including planetary gearing intermediate said driving and driven shafts for driving said driven shaft at a speed greater than that of said driving shaft, said intermediate driving means including cooperating clutching members one of which is actuated by centrifugal force for engagement with the other when the speeds of said clutching members are substantially synchronized, one of said clutching members prior to clutching engagement with the other being drivingly connected with one of said shafts for rotation at the same speed therewith and the other being drivingly connected through said planetary gearing with the other of said shafts for rotation at a speed differing therefrom, and releasable clutching means for driving said driven shaft from said driving shaft at the same speed therewith prior to engagement of said clutching members, said releasable clutching means comprising cooperating clutching elements engageable with each other when the speeds thereof are substantially synchronized, one of said clutching elements having movement thereof relative to movement of said centrifugal force operated clutching member and by centrifugal force acting thereon, said clutching elements being drivingly connected one to said driving shaft and the other to said driven shaft to provide a direct drive therebetween releasable to permit engagement of said clutching members when synchronized as aforesaid.

21. In a motor vehicle drive, aligned driving and driven shafts, means including planetary gearing intermediate said driving and driven shafts for driving said driven shaft at a speed greater than that of said driving shaft, said intermediate driving means including cooperating clutching members one of which is actuated by centrifugal force for engagement with the other when the speeds of said clutching members are substantially synchronized, one of said clutching members prior to clutching engagement with the other being drivingly connected with one of said shafts for rotation at the same speed therewith and the other being drivingly connected through said planetary gearing with the other of said shafts for rotation at a speed differing therefrom, releasable clutching means for driving said driven shaft from said driving shaft at the same speed therewith prior to engagement of said clutching members, said releasable clutching means comprising cooperating clutching elements engageable with each other when the speeds thereof are substantially synchronized, one of said clutching elements having movement thereof relative to movement of said centrifugal force operated clutching member and by centrifugal force acting thereon, said clutching elements being drivingly connected one to said driving shaft and the other to said driven shaft to provide a direct drive therebetween releasable to permit engagement of said clutching members when synchronized as aforesaid, and means operable between said centrifugal force operated clutching member and said centrifugal force moved clutching element for controlling relative movement thereof.

22. In a drive for a motor vehicle having a power driving shaft and a shaft driven therefrom and adapted to drive said vehicle, speed responsive clutching means releasably connecting said shafts for a direct drive therebetween, said clutching means including cooperating clutching members one of which is adapted for centrifugal force actuation relative to the other, overdriving means including planetary gearing between said shafts for driving said driven shaft at a speed greater than the speed of the driving shaft, said overdriving means further including additional speed responsive clutching means comprising clutching structures respectively drivingly connected to one of said shafts and to an element of said planetary gearing for controlling the drive through said planetary gearing, one of said clutching structures being adapted for centrifugal force clutching movement relative to movement of said centrifugal force actuated clutching member and relative to the other of said clutching structures.

23. In a drive for a motor vehicle having a power driving shaft and a shaft driven therefrom and adapted to drive said vehicle, speed responsive clutching means releasably connecting said shafts for a direct drive therebetween, said clutching means including cooperating clutching members one of which is adapted for centrifugal force actuation relative to the other, overdriving means including planetary gearing between said shafts for driving said driven shaft at a speed greater than the speed of the driving shaft, said overdriving means further including additional speed responsive clutching means comprising clutching structures respectively drivingly connected to one of said shafts and to an element of said planetary gearing for controlling the drive through said planetary gearing, one of said clutching structures being adapted for centrifugal force clutching movement relative to movement of said centrifugal force actuated clutching member and relative to the other of said clutching structures, and means operable between said centrifugal force actuated clutching member and said centrifugal force moved clutching structure for controlling relative movement thereof.

24. In a drive for a motor vehicle having a power driving shaft and a shaft driven therefrom and adapted to drive said vehicle, speed responsive clutching means releasably connecting said shafts for a direct drive therebetween, said clutching means including clutching members one of which is adapted for centrifugal force actuation relative to the other for releasing said direct drive, overdriving means including planetary gearing between said shafts for driving said driven shaft at a speed greater than the speed of the driving shaft, said overdriving means further including additional speed responsive clutching means comprising clutching structures respectively drivingly connected to one of said shafts and to an element of said planetary gearing for controlling the drive through said planetary gearing, one of said clutching structures being adapted for centrifugal force clutching movement relative to movement of said centrifugal force actuated clutching member and relative to the other of said clutching structures for clutching with the latter when substantially synchronized therewith.

WILLIAM T. DUNN.

CERTIFICATE OF CORRECTION.

Patent No. 2,159,428.   May 23, 1939.

WILLIAM T. DUNN.

It is hereby certified that error appears in the printed specification of the above numbered patent requiring correction as follows: Page 4, second column, lines 34 and 68, claims 1 and 2 respectively, for the word "clutch" read clutching; page 6, first column, line 48, claim 11, strike out "from"; page 7, second column, line 13, claim 19, for "membe" read member; and that the said Letters Patent should be read with this correction therein that the same may conform to the record of the case in the Patent Office.

Signed and sealed this 10th day of October, A. D. 1939.

(Seal)

Henry Van Arsdale,
Acting Commissioner of Patents.